(12) United States Patent
Iacona et al.

(10) Patent No.: US 12,588,585 B2
(45) Date of Patent: Mar. 31, 2026

(54) VEGETATION CUTTING APPARATUS

(71) Applicant: ECHO INCORPORATED, Lake Zurich, IL (US)

(72) Inventors: Fernando Iacona, Paradise Valley, AZ (US); Joseph John Zenkus, Lake in the Hills, IL (US); Ryan Garrett, Buffalo Grove, IL (US)

(73) Assignee: ECHO INCORPORATED, Lake Zurich, IL (US)

( * ) Notice: Subject to any disclaimer, the term of this patent is extended or adjusted under 35 U.S.C. 154(b) by 443 days.

(21) Appl. No.: 18/137,646

(22) Filed: Apr. 21, 2023

(65) Prior Publication Data

US 2023/0345869 A1 Nov. 2, 2023

Related U.S. Application Data

(60) Provisional application No. 63/336,013, filed on Apr. 28, 2022.

(51) Int. Cl.
*A01D 34/416* (2006.01)
*A01D 34/73* (2006.01)
*A01D 34/82* (2006.01)

(52) U.S. Cl.
CPC ....... *A01D 34/4165* (2013.01); *A01D 34/733* (2013.01); *A01D 34/82* (2013.01)

(58) Field of Classification Search
CPC .............. A01D 34/416; A01D 34/4165; A01D 34/4161; A01D 34/4162; A01D 34/4163; A01D 34/733; A01D 34/82
See application file for complete search history.

(56) References Cited

U.S. PATENT DOCUMENTS

| | | | | |
|---|---|---|---|---|
| 4,104,797 A | | 8/1978 | Ballas | |
| 4,347,666 A | | 9/1982 | Moore | |
| 5,020,224 A | * | 6/1991 | Haupt | A01D 34/4162 30/276 |
| 5,671,536 A | * | 9/1997 | Everts | A01D 34/416 30/276 |
| 6,952,877 B2 | * | 10/2005 | Pfaltzgraff | A01D 34/4163 30/276 |
| 2005/0076515 A1 | | 4/2005 | Proulx | |
| 2005/0217120 A1 | * | 10/2005 | Proulx | A01D 34/4163 30/276 |
| 2007/0084061 A1 | * | 4/2007 | Bennett | A01D 34/416 30/276 |
| 2011/0119923 A1 | | 5/2011 | Nicoll | |

(Continued)

OTHER PUBLICATIONS

Office Action issued Sep. 11, 2025, in U.S. Appl. No. 18/137,579.

*Primary Examiner* — Adam J Behrens

(74) *Attorney, Agent, or Firm* — Wood, Phillips, Katz, Clark & Mortimer

(57) ABSTRACT

The combination of: a cutting head having a spool on which at least one cutting element is located and configured to be driven around an operating axis by a rotary drive to which the cutting head is coupled; and a coupling system with a core and a first adaptor assembly releasably joinable to each other and the spool. The core is keyed directly to the spool. The first adaptor assembly extends from the core and defines a driven component to engage the rotary drive. A part of the core that engages the spool to cause the core to be keyed directly to the spool is made from metal.

23 Claims, 11 Drawing Sheets

(56)  References Cited

U.S. PATENT DOCUMENTS

| | | |
|---|---|---|
| 2013/0133208 A1 | 5/2013 | Skinner |
| 2016/0183452 A1 | 6/2016 | Kullberg |
| 2018/0242520 A1 | 8/2018 | Zenkus |
| 2018/0271011 A1 | 9/2018 | Zenkus |
| 2018/0279547 A1* | 10/2018 | Sergyeyenko ..... A01D 34/4167 |
| 2020/0128728 A1* | 4/2020 | Guo .................. A01D 34/4163 |
| 2020/0170182 A1 | 6/2020 | Guo |
| 2020/0315089 A1* | 10/2020 | Racz ................... A01D 34/416 |
| 2021/0076564 A1 | 3/2021 | Guo |

* cited by examiner

POWER SOURCE 26

FRAME 24

DRIVING COMPONENT/ ROTARY DRIVE 28

110

22

COUPLING SYSTEM 114

PART 113

CUTTING HEAD 111

CUTTING ELEMENT(S) 112

CORE 118

CORE 118a

ADAPTOR ASSEMBLY 120a

COMPONENT(S) 122a

ADAPTOR ASSEMBLY 120b

COMPONENT(S) 122b

114

POWERING UNIT 22

DRIVING COMPONENT/ ROTARY DRIVE 28

COUPLING SYSTEM 114

SPOOL 116

CUTTING HEAD 111

VEGETATION CUTTING APPARATUS

CROSS-REFERENCE TO RELATED APPLICATIONS

This is a non-provisional application claiming priority to U.S. Provisional Application No. 63/336,013, filed Apr. 28, 2022, which is incorporated herein by reference.

BACKGROUND OF THE INVENTION

Field of the Invention

This invention relates to vegetation cutting apparatus and, more particularly, to an apparatus having at least one cutting element that is caused to move in a cutting path upon the vegetation cutting apparatus being coupled to a rotary drive input.

Background Art

A multitude of vegetation cutting devices are currently available in the market, with one category thereof utilizing a replaceable cutting apparatus, commonly referred to as a "head", that carries at least one cutting element that is caused to move in a cutting path as a rotary drive, coupled to the head, is operated.

Numerous manufacturers currently offer head designs— many with different constructions and operational capabilities. It is known to sell these heads in a "kit" form which allows each head to be adapted to be usable on powering units, consisting of frames supporting power sources, and having driving components with different coupling configurations.

One subcategory of heads is constructed with a housing that at least partially contains a spool with at least one cutting element, wherein the spool is driven directly through a component that is rotated as the power source is operated. The assignee herein currently offers this type of head and additionally offers the same in "kit" form with components that are strategically combined to allow the head to be coupled to different drive components associated with powering units offered by different manufacturers.

A current commercial form of Applicant's head offered with "kit" components is based generally on the design shown in the assignee's U.S. Pat. No. 6,952,877 (the '877 patent). The kit allows a user to select different forms of coupling assemblies, consisting of different combinations of what are commercially identified as a core, a bushing, and an adaptor shaft. By selecting an appropriate combination of the core, bushing, and shaft, a user can adapt the head to both left-handed and right-handed drive operation, as well as effect combinations to couple with driving components having different configurations—be it by reason of different diameter, thread pitch, overall shape, etc.

As shown in the '877 patent, the core has a bifurcated end that straddles an elongate bar on the spool. A cutting line is directed radially through the spool in substantial coincidence with the rotary axis for the spool. In this embodiment, a headed shaft projects upwardly through the core, is keyed thereto against rotation, and projects upwardly to allow the shaft to threadably engage a component with a threaded male part, that in turn engages a female driving component on the powering unit.

By selecting different headed shafts, the appropriate male driven component can be selected to cooperate with a matching female driving component on the powering unit.

This basic construction has been commercially successful, with excellent dynamic operating characteristics and has been reliable in operation.

One challenge with the above type of structure has been to assure smooth operation at high rotational speeds for an extended product life.

Heretofore, the core has been made from a non-metal material which is keyed directly to the headed shaft that is made from metal. Over extended periods, the non-metal material on the core may tend to deform, as a result of which precise axial alignment between the core and headed shaft may be lost.

This deformation may also produce some welding between the headed shaft and core, which may make separation thereof more difficult in the event that a different coupling arrangement is utilized, as when a powering unit with a different driving component is employed. This welding action may also compromise spool alignment.

Further, the depicted core engages and drives the elongate bar on the spool at spaced locations. Thus, there may be a relatively limited contact area, which may contribute to material abrasion over time which may produce looseness in the connection between the core and spool and alter precisely how the drive forces are imparted from the core to the spool.

With the goals of smoothly and positively driving the spool and avoiding changes in operating characteristics over time, the industry continues to seek out improvements to make even better performing cutting apparatus.

SUMMARY OF THE INVENTION

In one form, the invention is directed to the combination of a cutting head and a coupling system. The cutting head has an operating axis and at least one cutting element for severing vegetation. The cutting head has a housing and a spool joined with the housing on which the at least one cutting element is located. The spool is movable axially and angularly with respect to at least a part of the housing. The spool is configured to be driven around the operating axis to cause the at least one cutting element to move in a cutting path and thereby sever vegetation in the cutting path of the driven at least one cutting element. The cutting head is configured to be coupled to a rotary drive. As an incident of the rotary drive being operated with the cutting head coupled to the rotary drive, the spool is caused to be driven around the operating axis, as an incident of which the at least one cutting element moves in the cutting path. The coupling system has a core and a first adaptor assembly portion. The core and first adaptor assembly are releasably joinable to each other and the spool. The core is configured so that when joined to the spool, the core keys directly to the spool so that the spool and core move together around the operating axis. The first adaptor assembly extends from the core and defines a driven component to engage a driving component on the rotary drive to thereby couple the cutting head to the rotary drive. The part of the core that engages the spool to cause the core to be keyed directly to the spool is made from metal.

In one form, the first adaptor assembly is a single component that is releasably connected to the core and defines the driven component.

In one form, the first adaptor assembly has first and second components. The first component is releasably connected to the core. The second component is releasably connected to the first component and defines the driven component.

3

In one form, the core and the first component are made from metal.

In one form, the first component and core are press connected together. The first component and second component are threadably connected together.

In one form, the core has a perimeter surface with a plurality of flat surface portions. The spool has flat surface portions that each facially confronts one of the flat surface portions on the perimeter surface. The confronting flat surface portions on the perimeter surface and spool cooperatively key the core to the spool.

In one form, the spool has an elongate bar. The core has facing surfaces between which at least a part of the elongate bore resides. The part of the elongate bar and facing surfaces cooperate to key the core to the spool.

In one form, the second component is a male part with a first form and a first form of external threads to engage a driving component on the rotary drive with the cutting head coupled to the rotary drive.

In one form, the first component has a perimeter surface. The core has a through bore bounded by a surface which engages and is keyed to the perimeter surface on the first component.

In one form, the combination described above is provided in further combination with a second adaptor assembly. The first and second adaptor assemblies are interchangeably usable, one in place of the other, together with the core, to allow coupling of the cutting head to the rotary drive. The second adaptor assembly defines a male part with a second form and a second form of external threads to engage a driving component on the rotary drive.

In one form, the spool has an elongate bar. The core has facing surfaces between which at least a part of the elongate bar resides. The elongate bar and facing surfaces cooperate to key the core to the spool. The elongate bar has axially spaced top and bottom surfaces. The core has radially spaced and axially facing surfaces that are substantially flush with the bottom surface on the elongate bar.

In one form, the spool has axially oppositely facing top and bottom surfaces. The spool has an opening with a volume into which the core can be directed. The core and elongate bar together substantially fill the opening volume from the top surface of the spool to the bottom surface of the elongate bar.

In one form, an elongate flexible line is wrapped around a portion of the spool. A length of the elongate flexible line projects away from the housing and defines the at least one cutting element.

In one form, the elongate flexible line extends through an opening in the housing. The housing and spool are configured so that the spool can be controllably moved axially within the housing as the spool is driven to allow incremental relative angular movement between the spool and housing to occur, as an incident of which a controlled length of the elongate flexible line is advanced outwardly through the housing opening.

In one form, the cutting head further has a spring assembly acting between the spool and one part of the housing to produce an axial biasing force on the spool. The spring assembly bears against the bottom surface of the elongate bar and the radially spaced and axially facing surfaces of the core.

In one form, the combination described above is provided in further combination with a portable frame and a power source on the frame with a driven rotary component that engages the adaptor assembly to cause the spool to be driven around the operating axis as the power source is operated.

In one form, the housing has upper and lower parts configured to be releasably maintained together and between which the spool captively resides.

In one form, the core extends through and projects to above the upper housing portion.

In one form, the housing has upper and lower parts. The one part of the housing that the spring assembly acts between is the lower housing part.

In one form, the first component has an axial dimension greater than an axial dimension of the core.

DETAILED DESCRIPTION OF THE PREFERRED EMBODIMENT

Figure 1:
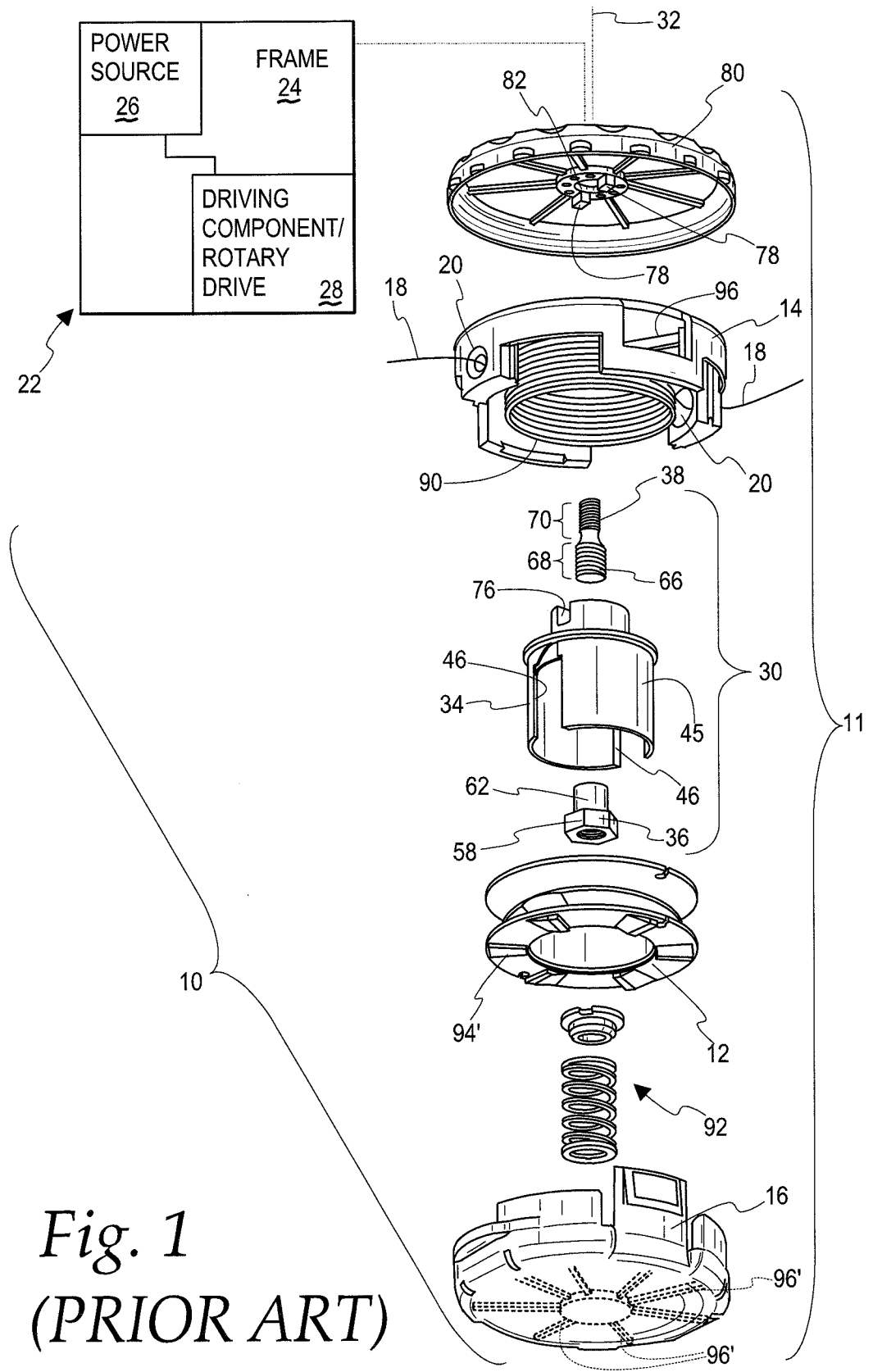
FIG. 1 is a partially schematic, exploded, perspective view of a prior art system for cutting vegetation, including a cutting head and a powering unit for the cutting head.

In FIGS. 1-9, a vegetation cutting system, currently offered by the assignee herein and described generally in the Background Art section above, is depicted at 10. The vegetation cutting system 10 incorporates a number of features disclosed in U.S. Pat. No. 6,952,877, the disclosure of which is incorporated herein by reference.

The vegetation cutting system 10 consists of a cutting head 11 with primary components thereof being a spool 12, joinable upper and lower housing parts 14, 16, respectively, between which the spool 12 is captively maintained, and a plurality of cutting elements 18 projecting through diametrically oppositely located openings 20 in the upper housing part 14.

The spool 12 is driven by a powering unit 22 consisting of a portable frame 24 on which a power source 26 is mounted. The power source 26 may be operated through a combustible fuel, through a conventional power supply, through a battery, etc. The power source 26 turns a driving component/rotary drive 28 which is coupled to the cutting head 11 and, more specifically to the spool 12, through a coupling system, shown in one exemplary form at 30 in FIG. 1. With the cutting head coupled to the driving component/rotary drive 28, the spool 12 is driven around an operating axis 32 for the cutting head 11.

The coupling system 30 in FIG. 1 consists of a core 34, a first component 36 press fit to the core 34, and a second component 38 connected to the first component 36.

The core 34 is keyed directly to the spool 12. The core 34 has a cylindrical main portion 40 that is dimensioned to slide guidingly within an axial through opening 42 in the spool 12. The spool 12 has an elongate bar 44 which spans the opening 42, proximate the center thereof, so that the axis 32 extends through the elongate bar 44. The cylindrical main portion 40 of the core 34 has an outer wall 45 with two axial slots 46 therethrough, each with a width dimension W approximately equal to a width dimension W1 of the elongate bar 44. Accordingly, by sliding the cylindrical main portion 40 axially into the opening 42, the elongate bar 44 slides guidingly within the slots 46, whereby a keyed connection is made so that the spool 12 and core 34 move together around the axis 32 in either turning direction of the core 34.

Figures 2, 3, 4, 5:
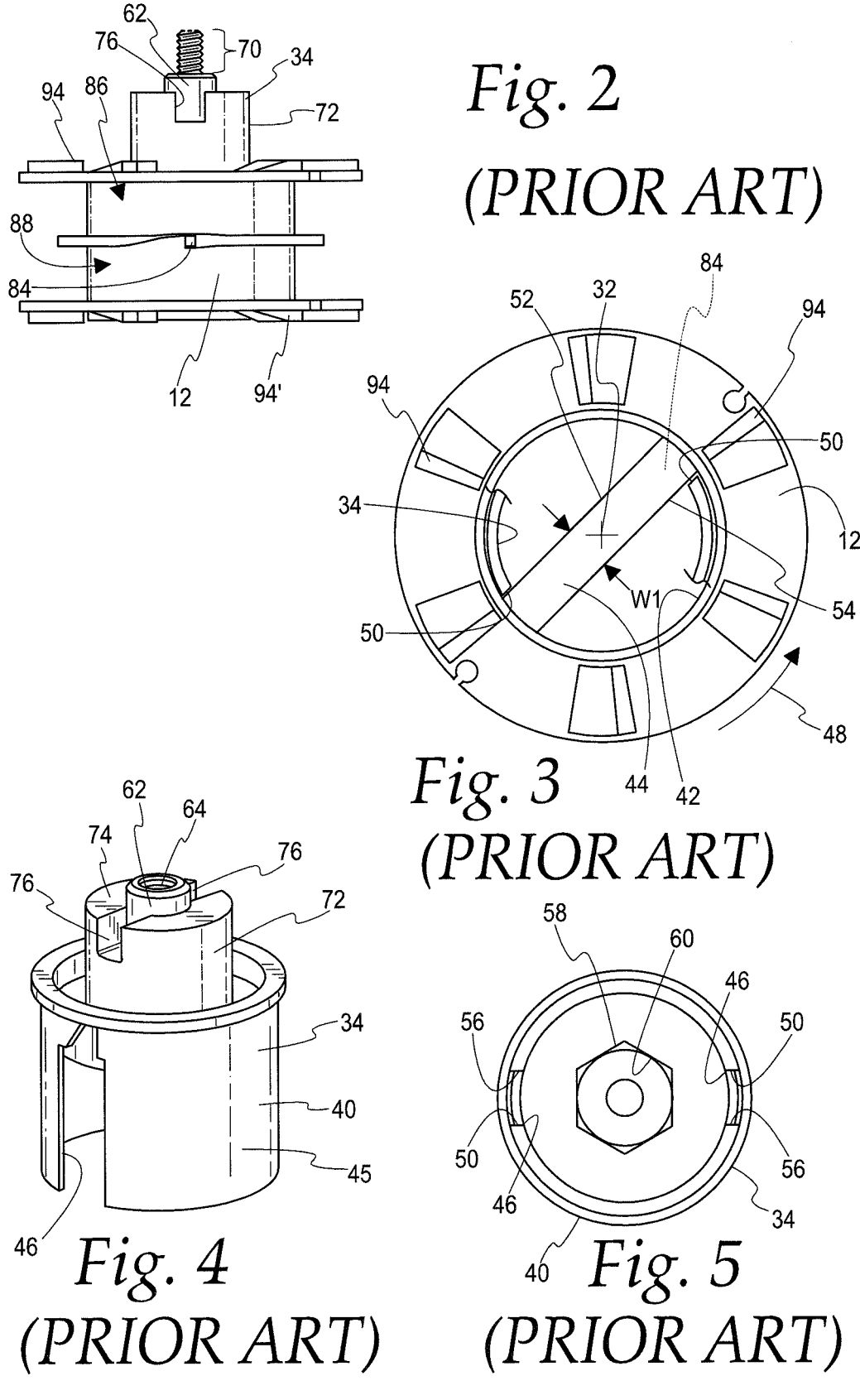
FIG. 2 is an enlarged, side elevation view of a spool on the cutting head in FIG. 1 with a coupling system thereon for coupling the spool to a driving component/rotary drive on the powering unit.
FIG. 3 is a top view of the spool in FIG. 2.
FIG. 4 is a perspective view of the coupling system as shown in FIG. 2.
FIG. 5 is a bottom view of the coupling system as shown in FIGS. 2 and 4.

Turning of the core 34 in one direction around the axis 32, as indicated by the arrow 48 in FIG. 3, causes diametrically opposite edges 50 bounding the slots 46 to bear on opposite sides 52, 54 of the elongate bar 44. Turning the core 34 oppositely to the direction indicated by the arrow 48 bears the other slot bounding edges 56 against the sides 52, 54 of the elongate bar 44.

The first component 36 has a polygonally-shaped head 58 that is pressed into a complementary receptacle 60 on the core 34 to frictionally maintain the same thereagainst. The head 58 is thereby keyed to the core 34 so that the core 34 and head 58 move together around the operating axis 32.

The first component 36 has a body/shaft 62 which projects to above the core 34 with the first component 36 pressed into the core 34. The body/shaft 62 has internal threads 64 exposed at the top thereof.

The second component 38 has an elongate body 66 with a lower, externally threaded length 68 that can be engaged with the threads 64 on the first component 36.

An upper length 70 of the body 66 is externally threaded to engage a complementary form of the driving component/rotary drive 28 on the powering unit.

With the coupling system 30 used on the cutting head 11, the threaded length 70 of the second component 38 projects to above the upper housing part 14 to be engageable with the driving component/rotary drive 28.

A reduced diameter core portion 72 likewise projects to above the upper housing part 14. The upper free edge 74 of the reduced diameter core portion 72 has diametrically opposite undercuts 76 to make keyed connection, one each, with diametrically opposite bosses 78 on the underside of a flat, knurled knob 80 which can be grasped and repositioned to manually turn the spool 12 from above the upper housing part 14. The knob 80 has a through opening 82 to accommodate the projecting length 70 of the body 66.

The core 34 is made from a molded, non-metal material which interacts with a non-metal material making up the spool 12, including the elongate bar 44. The first and second components 36, 38 are made from metal.

Figures 6, 7, 8, 9:
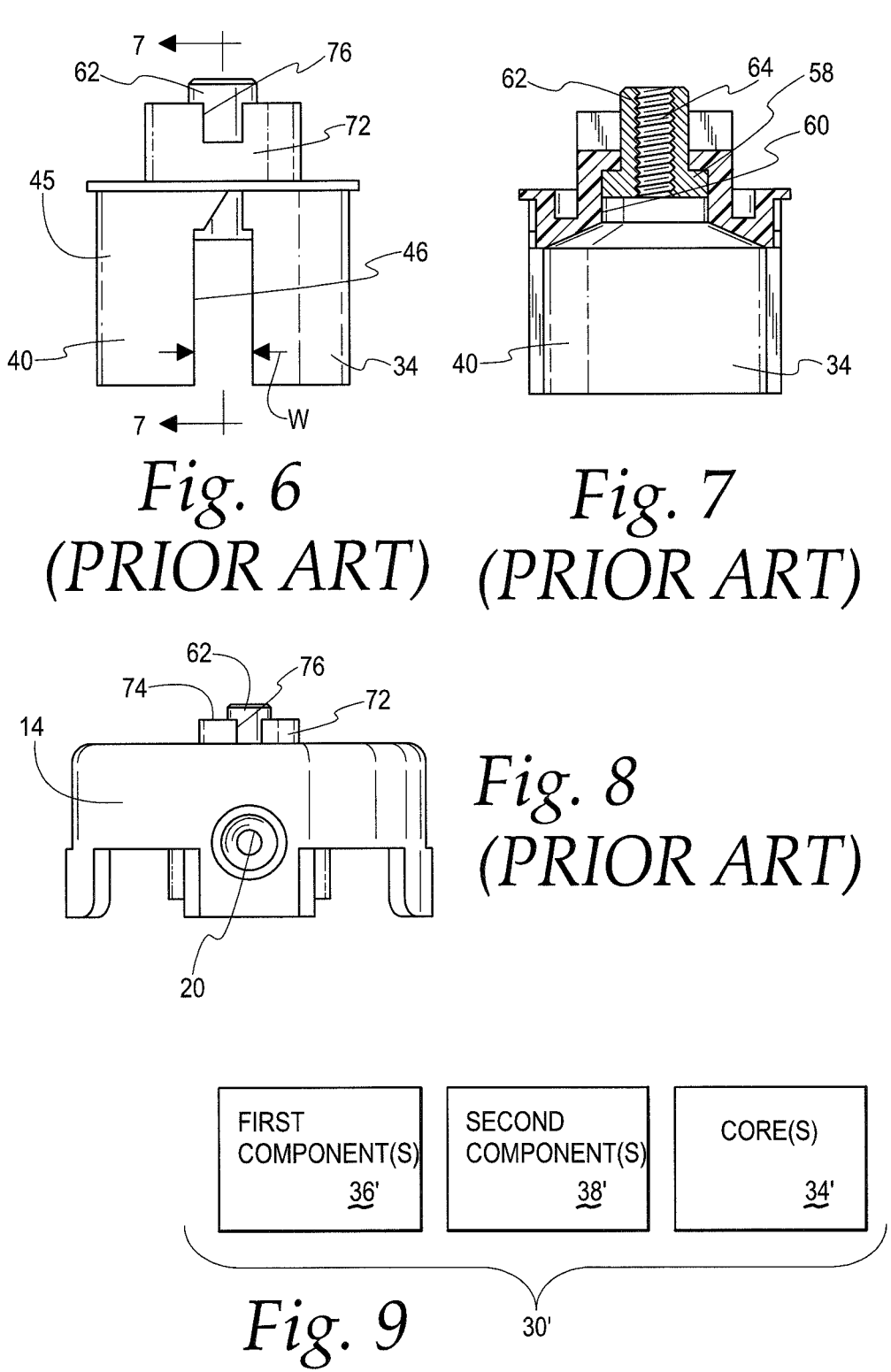
FIG. 6 is a side elevation view of the coupling system in FIGS. 2, 4, and 5.
FIG. 7 is a cross-sectional view of the coupling system taken along line 7-7 of FIG. 6.
FIG. 8 is an elevation view of an upper housing part on the cutting head in FIG. 1 and with the coupling system in FIGS. 2 and 4-7 connected thereto.
FIG. 9 is a schematic representation of a prior art coupling system including interchangeable cores and components.

In the commercial form of the assignee's system 10, the coupling system, as shown generically at 30' in FIG. 9, consists of multiple first components 36', multiple second components 38', and multiple cores 34'. Instructions are given a purchaser as to which of the first and second components 36', 38' and core 34' are to be utilized together to produce a configuration that will couple with the driving component/rotary drive 28 on a particular powering unit 22, with potential different forms thereof dictated by different manufacturers. The components 36', 38' have been color coded to facilitate identification.

Aside from accommodating different basic configurations of driving components/rotary drives 28, the components 36', 38' and core 34' are strategically matched to adapt to left- and right-handed driving directions for the driving component/rotary drive 28.

In the commercial embodiment for the cutting head 11, the spool 12 has a radial through passage 84, which extends through the elongate bar 44, to allow lengths of a continuous cutting line 90 to be simultaneously wrapped around the spool 12 to reside in upper and lower core volumes 86, 88 from where the free ends 18 project through the upper housing part 14 to define projecting lengths that produce the individual cutting elements 18.

The cutting head 11 has an incremental line feeding feature wherein angular turning of the combined housing parts 14, 16 relative to the spool 12 causes the free ends of the cutting line 90 to project controllably further away from the housing part 14 during operation of the cutting head 11.

With the cutting head 11 in an assembled state, a spring assembly 92 acts between the lower housing part 16 and the underside of the elongate bar 44 to urge indexing components 94 on the top of the spool 12 into axial overlapping relationship with radially projecting indexing components 96 on the upper housing part 14.

Corresponding components 94' on the bottom of the spool 12 cooperate with corresponding arrangement of radially projecting components 96' on the bottom housing part 16.

As explained in U.S. Pat. No. 6,952,877, with the cutting head 11 rotating in operation, a downward impact of the lower housing part 16 on a hard surface causes the momentum of the spool 12 to move it downwardly against a force developed by the spring assembly 92, whereby the components 94, 96 disengage. This movement causes the components 94', 96' to engage after a controlled relative angular movement occurs between the spool 12 and the combined housing parts 14, 16, and increments of the line 90 extend from the housing part 14. The spool 12 then shifts upwardly under the residual force in the loaded spring assembly 92 to reengage the components 94, 96 after further increments of line are extended, resulting from an additional limited angular movement between the spool 12 and the combined housing parts 14, 16.

Figures 10, 11, 12:
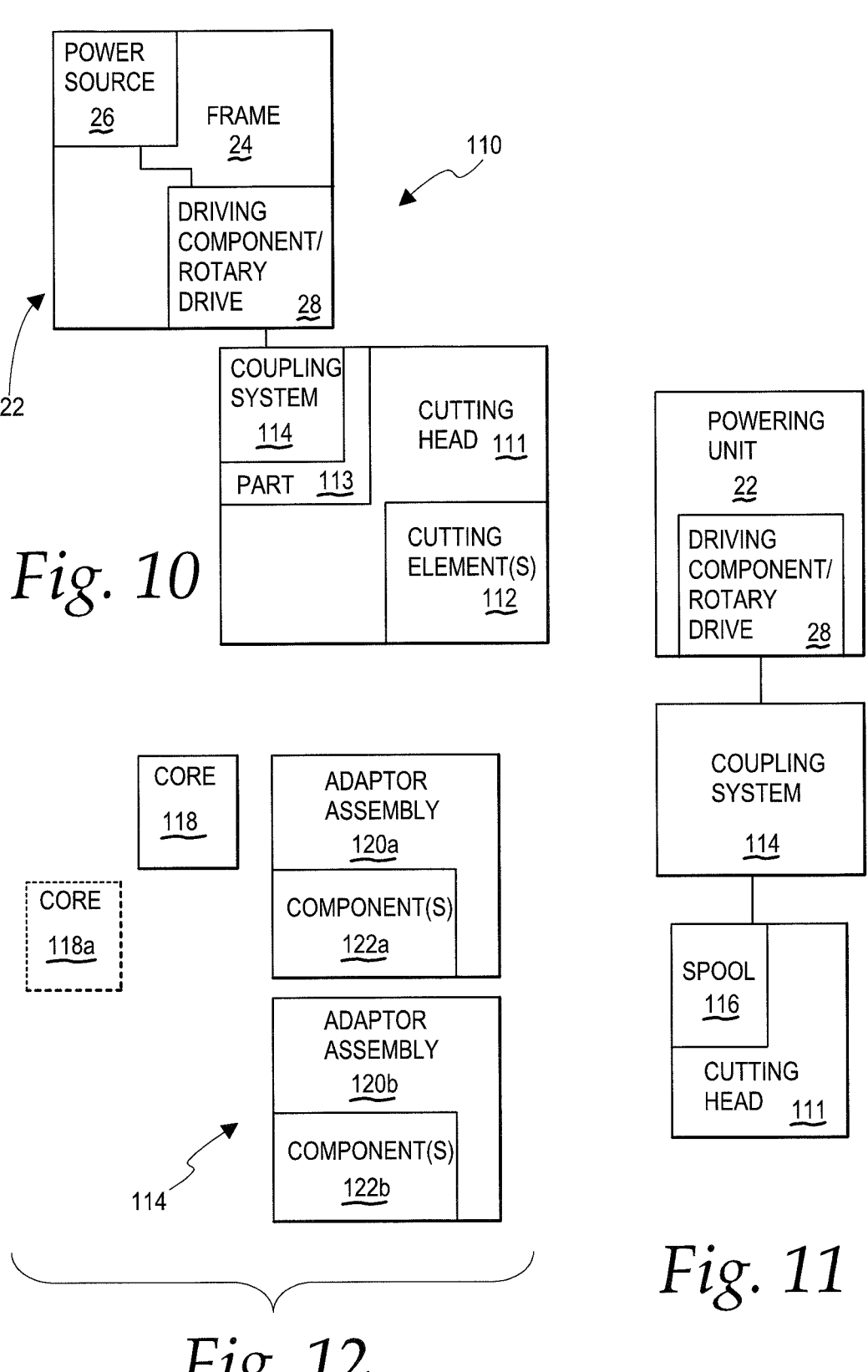
FIG. 10 is a schematic representation of a vegetation cutting system, according to the present invention.
FIG. 11 is a schematic representation of one form of the vegetation cutting system in FIG. 10 wherein a part of the cutting head that is driven in operation is a spool.
FIG. 12 is a schematic representation of a coupling system, according to the invention, and including one or more cores and one or more adaptor assemblies, each having one or more cooperating components.

A vegetation cutting system, according to the present invention, is shown in schematic form at 110 in FIG. 10. The vegetation cutting system 110 is made up of a cutting head 111 with at least one cutting element 112 for severing vegetation. At least a part 113 of the cutting head 111 is configured to be driven around an axis to cause the at least one cutting element 112 to move in a cutting path and thereby sever vegetation in the cutting path.

The cutting head 111 is configured to be coupled to the driving component/rotary drive 28 on the aforementioned powering unit 22, made up of the transportable frame 24 that supports the power source 26 for operating the driving component/rotary drive 28.

A coupling system 114 is provided to allow coupling of the cutting head 111 to the driving component/rotary drive 28 such that upon the driving component/rotary drive 28 being operated, the at least part 113 of the cutting head 111 is driven around an operating axis, as an incident of which the at least one cutting element 112 moves in its cutting path.

The generic showing of the cutting head 111 is intended to encompass virtually an unlimited number of different forms, with the below-described specific forms being exemplary in nature only.

In one category within the generic showing of FIG. 10, and as depicted schematically in FIG. 11, the cutting head 111 has a spool 116, with the spool 116 driven by the driving component/rotary drive 28 with the cutting head 111 coupled to the driving component/rotary drive 28 through the coupling system 114. With the coupling system 114 in place, at least part of the coupling system 114 becomes part of the cutting head 111.

As shown schematically in FIG. 12, the coupling system 114 consists of at least one core 118 and a first adaptor assembly 120a which is removably connected to the core 118 and coupled to the driving component/rotary drive 28.

In another form, the coupling system 114 consists of the core 118, the adaptor assembly 120a and a separate adaptor assembly 120b.

The adaptor assemblies 120a, 120b each includes at least one component 122a, 122b such that the components 122a, 122b are interchangeably usable, one in place of the other, to be releasably connected to the core 118 to couple, in the FIG. 11 form, the spool 116 to the driving component/rotary drive 28.

It is also contemplated that the coupling system 114 may include an additional core 118a that is usable in place of the core 118 with components 122a, 122b on either or both of the adaptor assemblies 120a, 120b.

As noted, while FIG. 11 depicts the coupling between the driving component/rotary drive 28 and cutting head 111 to be between the driving component/rotary drive 28 and spool 116, other configurations are contemplated within the generic showing in FIG. 10.

Figure 13:
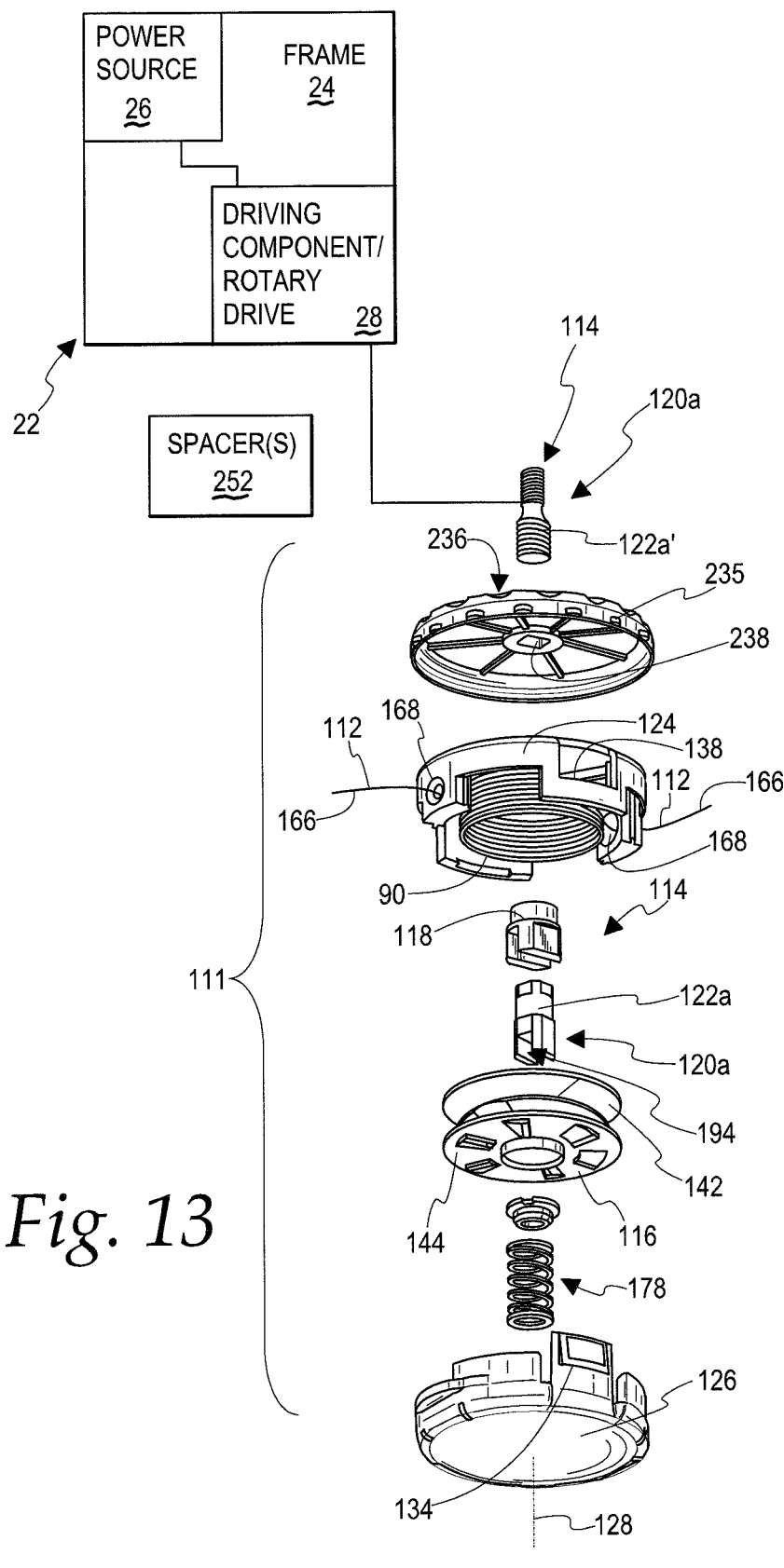
FIG. 13 is a partially schematic representation of a vegetation cutting system, according to the invention, including a cutting head with a coupling system used to couple the cutting head to a powering unit.

One specific, exemplary form of the coupling system 114 is shown in FIG. 13, consisting of a core 118 and an adaptor assembly 120a consisting of a first component 122a and a second component 122a'.

Before describing the details of the coupling system 114, the basic operation of the exemplary cutting head 111 will be described that is coupled to the aforementioned powering unit 22, consisting of the frame 24 on which the power source 26 and driving component/rotary drive 28 are provided.

The cutting head 111 functions overall in the same general fashion as the prior art cutting head 11, described above, and that in U.S. Pat. No. 6,952,877. It is only necessary to understand certain structural details of the cutting head 111 to fully understand the invention herein.

Figure 20:
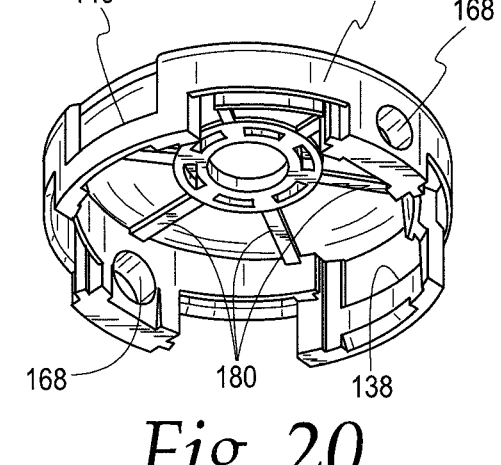
FIG. 20 is an enlarged, bottom, perspective view of an upper housing part on the cutting head in FIG. 13.
Figure 21:
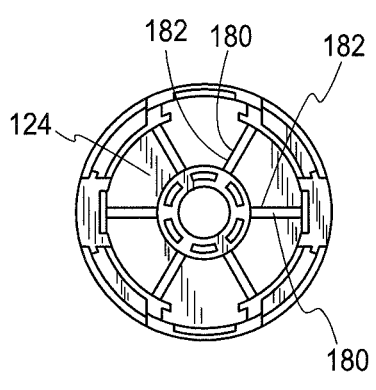
FIG. 21 is a bottom view of the upper housing part in FIG. 20.
Figure 22:
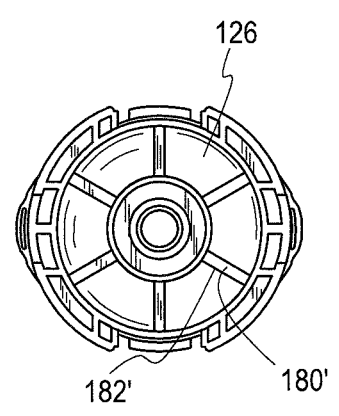
FIG. 22 is a plan view of the lower housing part on the cutting head in FIG. 13.
Figures 23, 24, 25, 26, 27, 28:
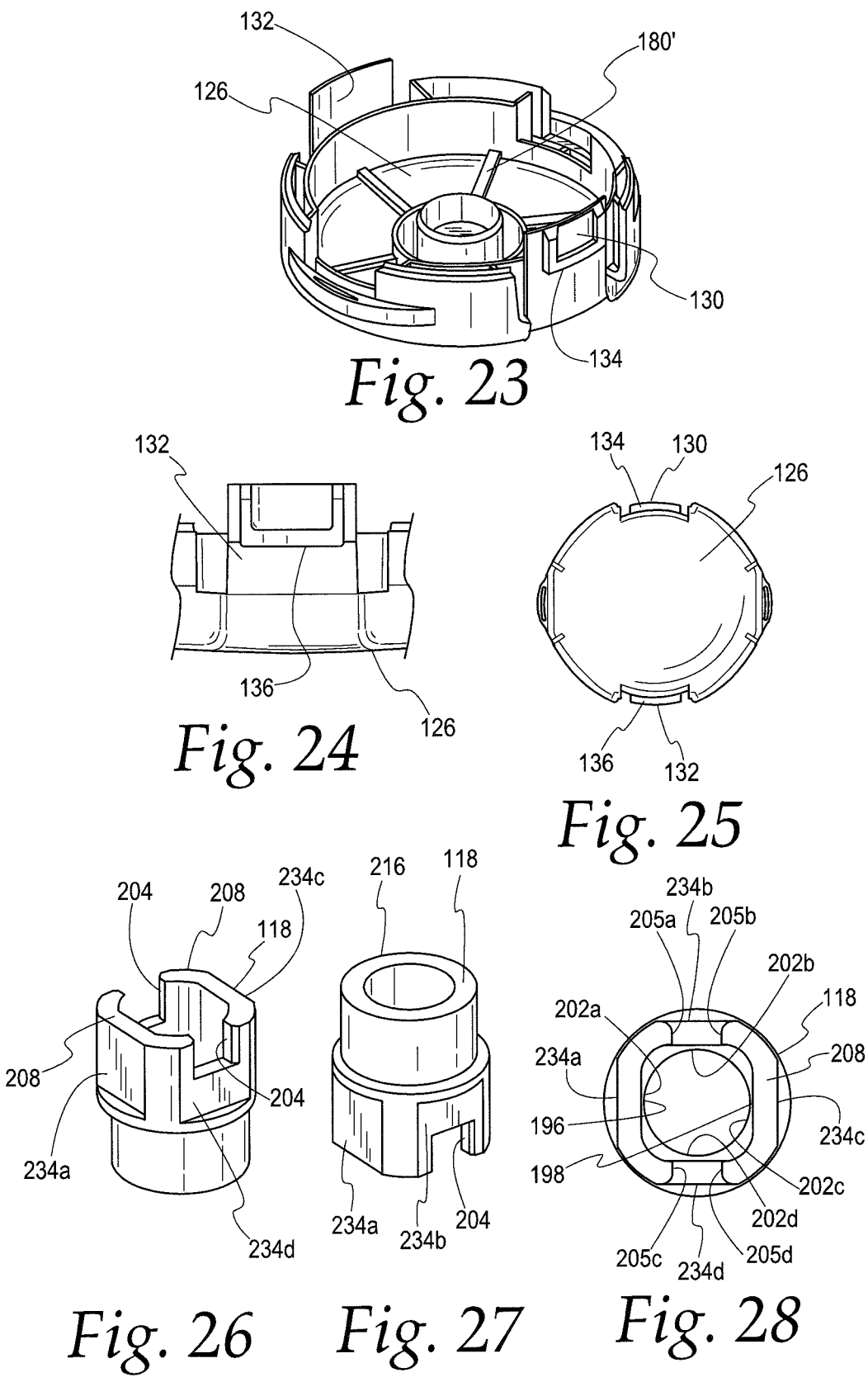
FIG. 23 is an enlarged, top, perspective view of the lower housing part in FIG. 22.
FIG. 24 is an enlarged, fragmentary view of a latch arm region on the lower housing part shown in FIGS. 22 and 23.
FIG. 25 is a bottom view of the lower housing part in FIGS. 22-24.
FIG. 26 is an enlarged, bottom perspective view of a core that is part of the coupling system shown on the cutting head in FIG. 13.
FIG. 27 is a top perspective view of the core in FIG. 26.
FIG. 28 is a bottom view of the core in FIGS. 26 and 27.
Figures 29, 30, 31:
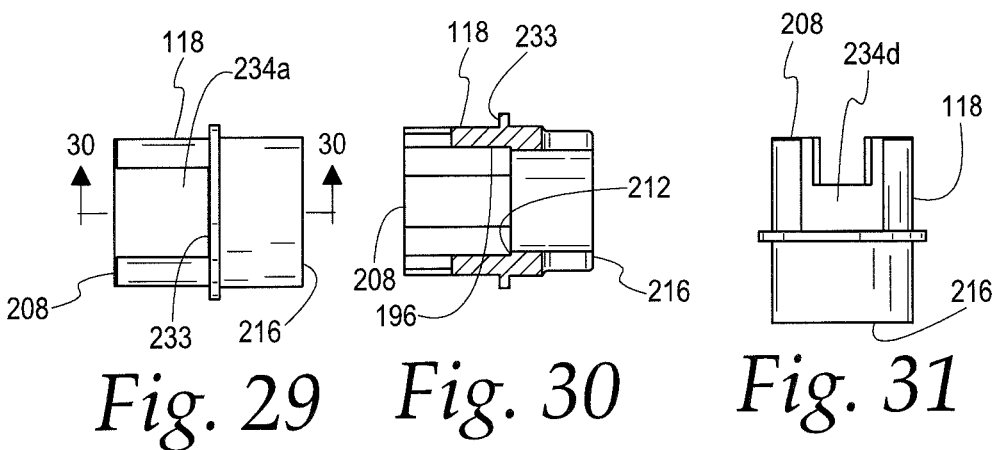
FIG. 29 is a side elevation view of the core in FIGS. 26-28.
FIG. 30 is a cross-sectional view of the core taken along line 30-30 of FIG. 29.
FIG. 31 is a side elevation view of the core in FIGS. 26-30 and turned 90° from the view in FIG. 29.
Figures 32, 33:
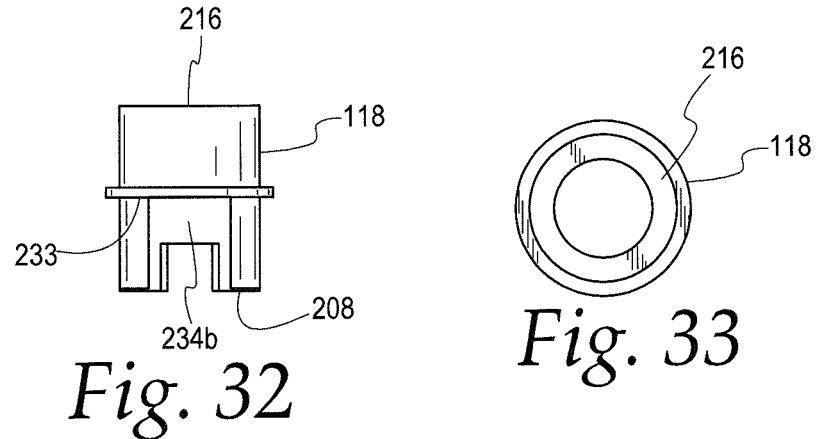
FIG. 32 is a side elevation view of the core in FIGS. 26-31 taken from the side opposite that in FIG. 31.
FIG. 33 is a top view of the core in FIGS. 26-32.
Figures 34, 35, 36:
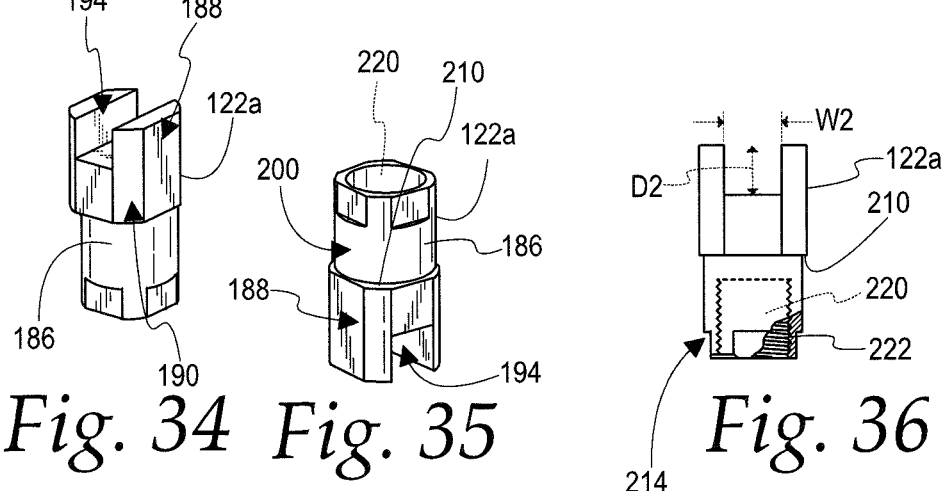
FIG. 34 is an enlarged, bottom perspective view of a first component making up part of an adaptor assembly on the coupling system shown on the cutting head in FIG. 13.
FIG. 35 is a top perspective view of the first component in FIG. 34.
FIG. 36 is a side elevation view of the first component in FIGS. 34 and 35.

The driven spool 116, as shown additionally in FIGS. 14-19, is captured between an upper housing part 124, as shown additionally in FIGS. 20 and 21, and a lower housing part 126, as shown additionally in FIGS. 22-25.

The upper and lower housing parts 124, 126, strategically angularly aligned, are movable towards each other along an operating axis 128 for the cutting head 111 from an axially spaced relationship, as shown in FIG. 13, to thereby cause diametrically oppositely located cantilevered latch components 130, 132 on the lower housing part 126, to be progressively deformed radially inwardly until a fully connected relationship between the housing parts 124, 126 is realized, whereupon the deformed latch components 130, 132 bend slightly outwardly, under restoring forces, thereby causing axially facing stop edges 134, 136, respectively on the latch components 130, 132, to confront edges 138, 140 on the upper housing part 124. This action effects a snap fit connection between the housing parts 124, 126 with the joined spool 116 captively therebetween.

The snap connected housing parts 124, 126 can be separated by deforming the latch components 130, 132 manually in a radial inward direction to take the edges 134, 138 and 136, 140 out of confronting relationship, and thereafter moving the housing parts 124, 126 axially away from each other.

The spool 116 is similar to the aforementioned spool 12 and consists of axially spaced walls 142, 144 and an intermediate annular flange 146 separating axially spaced volumes 148, 150, each for a supply of the cutting line 90.

A length of the line 90 is selected and one end thereof threaded radially fully through the spool 116, including through a passage 152 defined in part by an elongate bar 154 which spans a spool opening 156 extending axially through the spool 116 and bounded by circumferentially spaced flat surface portions 157a, 157b, 157c, 157d that cooperatively produce a generally square opening shape as viewed along the axis 128. The elongate bar 154 has a substantially squared cross-sectional shape, as viewed orthogonally to its length. That is, there are substantially parallel, axially oppositely facing flat surface portions 158, 160 and generally flat, radially oppositely facing surface portions 162, 164 that cooperatively define the exposed region of the elongate bar within the spool opening 156.

To build up a supply of the line 90 on the spool 116, with approximately one half of the selected line length directed fully through the spool 116, the spool 116 is manually turned. As this occurs, the line 90 can be guided to be wrapped around the spool in the separate volumes 148, 150. With the loaded spool 116 placed between the housing parts 124, 126, free end portions 166 can be directed through diametrically opposite openings 168 in the upper housing part 124, which free end portions 166 define the aforementioned cutting elements 112.

With the free end portions 166 directed through the openings 168 and the housing parts 124, 126 snap fit together, relative turning between the spool 116 and joined housing parts 124, 126 causes the line 90 to unwrap from the spool 116 so that the line advances from the openings 168 to increase the length of the cutting elements 112.

As in the prior embodiment described above, and that in U.S. Pat. No. 6,952,877, a running, incremental line feed mechanism may be incorporated, though this is not a requirement. Since this type of basic mechanism is well known and described in U.S. Pat. No. 6,952,877 and above, it will be described only briefly below.

Indexing components 170 project upwardly from the top spool wall 142 at circumferentially spaced locations around the operating axis 128. Each indexing component 170 has a ramp surface 172 which extends into a step 174 at the end of which a blocking edge 176 is located and faces in a circumferential direction.

With the cutting head 111 assembled, a spring assembly 178 acts between the lower housing part 126 and the axially facing surface 158 on the elongate bar 154 to place the indexing components 170 in axially overlapping relationship with indexing components 180 on the upper housing part 124, whereby the blocking edges 176 confront blocking edges 182 on the indexing components 180.

When the spool 116 is driven in the direction of the arrow 184 around the axis 128, the blocking edges 176 will engage, one each, with the blocking edges 182 to cause the joined housing portions 124, 126 to follow turning movement of the spool 116.

Corresponding indexing components 170' are provided on the spool wall 144 and cooperate with indexing components 180' on the lower housing part 126. With the indexing components 170', 180' in axially overlapping relationship, corresponding blocking edges 176', 182' engage to cause the joined housing parts 124, 126 to follow turning movement of the spool 116 in the direction indicated by the arrow 184 in FIG. 17.

With the cutting head 111 being driven in operation and the spring assembly 178 urging the indexing components 170, 180 into axial alignment, the joined housing parts 124, 126 will follow movement of the spool 116 in the direction of turning indicated by the arrow 184. By bumping the bottom of the lower housing part 126 on a solid surface, the spool 116 shifts axially downwardly against the force generated by the spring assembly 178, disengaging the indexing components 170, 180, thereby allowing the joined housing parts 124, 126 to shift angularly relative to the spool 116 until the indexing components 170', 180' engage. Through this action, an increment of line 90 is advanced from each of the openings 168. Once the spool 16 has shifted downwardly against the force developed by the spring assembly 178, a restoring force generated thereby shifts the spool 116 axially upwardly to disengage the indexing components 170', 180' and reengage the indexing components 170, 180. As this occurs, an additional length of the line 90 is advanced from the openings 168.

Details of an exemplary coupling assembly 114 will now be described, as shown in FIG. 13, including the core 118, as shown additionally in FIGS. 26-33 and 38-41, the first component 122a, shown additionally in FIGS. 34-41, and the second component 122a', shown additionally in FIG. 39.

The component 122a has a generally cylindrical body 186 with an enlarged, polygonally-shaped lower portion 188, as viewed along the axis 128, with a peripheral surface 190 having circumferentially spaced flat portions 192a, 192b, 192c, 192d formed thereon. A radial slot 194 is formed through the polygonally-shaped portion 188 and has a width W2 between facing surfaces 195a, 195b and depth D2 corresponding respectively to the width W3 (FIG. 16) and depth D3 (FIG. 15) of the elongate bar 154.

The component 122a is advanced guidingly into a through bore 196 defined on the core 118 and having a bounding surface 198 that is complementary to the overall outer surface 200 of the component body 186 to produce a readily releasable, press fit connection.

The flat portions 192a, 192b, 192c, 192d confront flat surfaces 202a, 202b, 202c, 202d on the core 118 to key the connected component 122a and core 118 against relative turning around the operational axis 128.

Figures 37, 38, 39, 40, 41:
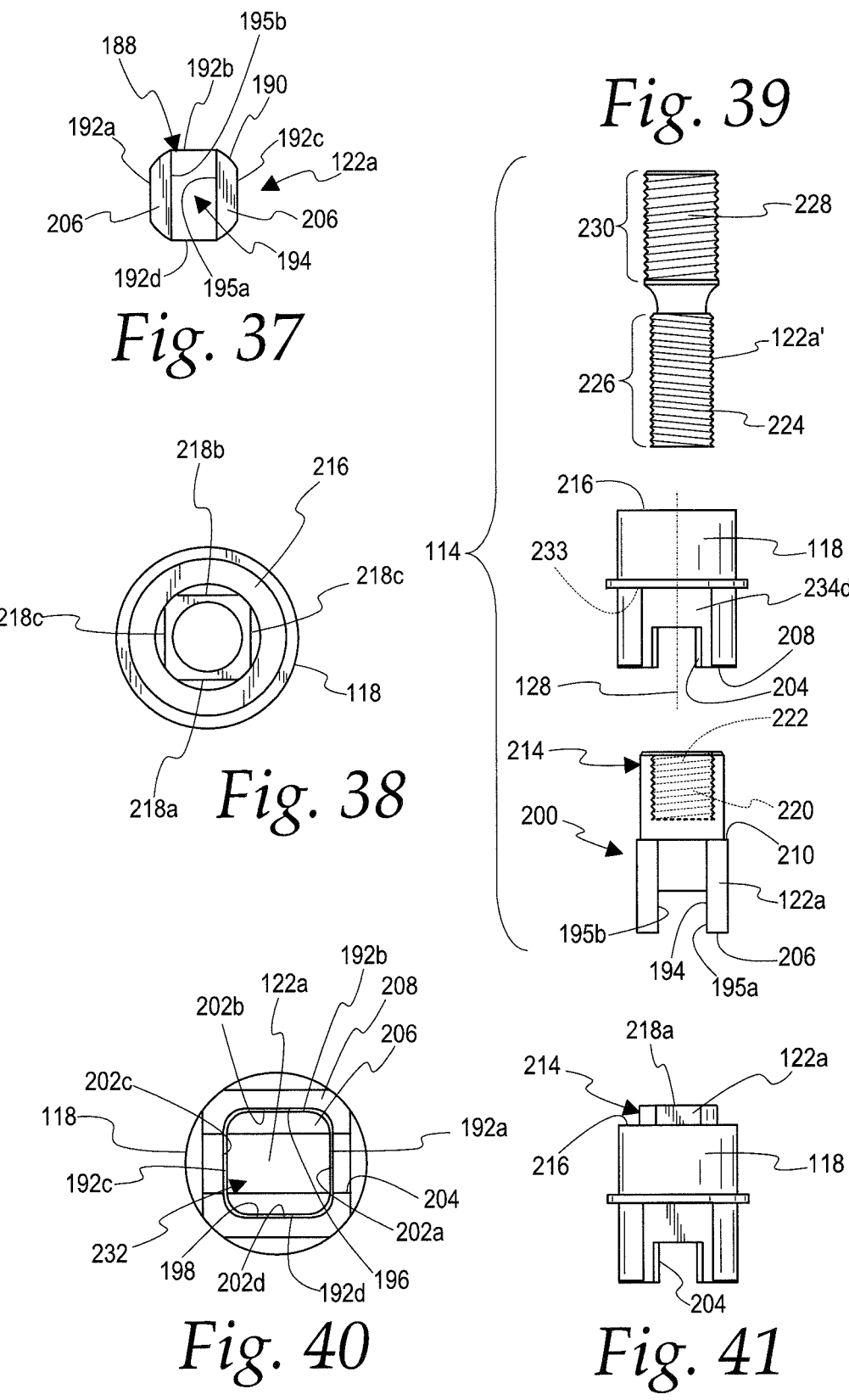
FIG. 37 is a bottom view of the first components in FIGS. 34-36.
FIG. 38 is an enlarged, plan view of the core and first component, as shown on the coupling system on the cutting head in FIG. 13 and in connected relationship.
FIG. 39 is an enlarged, exploded view of the coupling system as shown on the cutting head in FIG. 13.
FIG. 40 is an enlarged, bottom view of the core and first component, as shown on the coupling system on the cutting head in FIG. 13 and in connected relationship.
FIG. 41 is a side elevation view of the connected core and first component as shown in FIG. 40.

The core 118 has a radial through slot 204 that aligns with, and matches, the width and depth of the slot 194 on the component 122a with the core 118 and component 122a fully connected as in FIG. 40. The width of the slot 204 is defined between diametrically opposite, facing surface pairs 205a, 205b, and 205c, 205d.

With the component 122a advanced to a fully connected position, axial bottom edges 206, 208, respectively on the component 122a and core 118, are substantially flush. This fully connected position is consistently established by providing an annular shoulder 210 on the component 122a that abuts to an internal shoulder 212 on the core 118.

In this position, a top end 214 of the component 122a, which is axially longer than the core 118, projects above a top edge 216 of the core 118. The projecting end 214 has a polygonal shape—in this case generally square with flat surface portions 218a, 218b, 218c, 218d as viewed along the axis 128.

The component 122a has an internally threaded bore portion 220 with threads 222 complementary to external threads 224 on a lower threaded length 226 on the component 122a'. Threads 228 on an upper threaded length 230 of the component 122a' are configured to threadably engage a particular form of the driving component/rotary drive 28 on the powering unit 22.

The coupling system 114 is assembled by first advancing the component 122a upwardly into the core 118—a simple press fit step. The combined component 122a and core 118 are angularly oriented to align the continuous slot 232, formed cooperatively by the slots 194, 204, with the elongate bar 154, whereupon the combined core 118 and component 122a can be advanced into the spool opening 156 to cause the elongate bar 154 to move into the slot 232, whereupon the core 118 and component 122a are keyed to each other and each independently keyed to the spool 116 so that the spool follows turning movement of the combined component 122a and core 118 turning movement thereof around the axis 128. The component 122a and core 118 may abut to the elongate bar and/or one or more axially facing shoulders 233 on the core 118 may abut the top of the spool 116 to establish a consistent connected relationship.

With the core 118 fully press fit, circumferentially spaced flat surface portions 234a, 234b, 234c, 234d on the outer circumference of the core 118 confront spool surfaces 157a, 157b, 157c, 157d, successively, to thereby key the core 118 to the spool 116 so that they move as one piece around the axis 128.

The component 122a' is configured so that the direction of the threads is such that as the powering unit 22 is operated, the driving component/rotary drive 28 tightens the lower thread length 226 into the component 122a.

The upper thread length 230 may be threadably engaged with the driving component/rotary drive 28. Any other type of connection, such as a keying arrangement instead of, or in addition to, the threaded connection is contemplated to cause the component 122a' to follow movement of the driving component/rotary drive 28.

A graspable knob 235 has an inverted cup shape that extends over the top region of the upper housing part 124. The knob 235 has a knurled peripheral gripping edge 236.

An edge of an opening 238 through the knob 235 is keyed to the polygonally-shaped top end 214 of the component 122a. By pressing the knob 235 into position, a keyed connection is established between the knob 235 and component 122a, whereupon the knob 235 can be grasped and manually turned to turn therewith the spool 116 through the coupling system 114.

Figure 42:
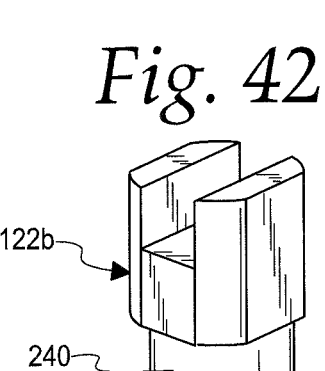
FIG. 42 is an enlarged, bottom, perspective view of a third component, making up part of the inventive coupling system and usable interchangeably with the first component as shown in FIGS. 34-39.
Figure 43:
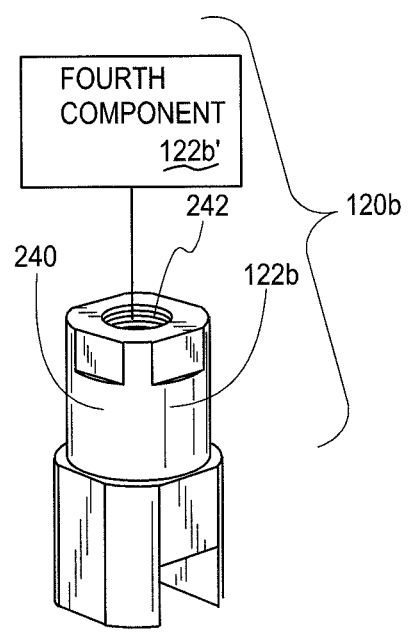
FIG. 43 is a top perspective view of the third component in FIG. 42 in combination with a fourth component, corresponding to the second component, as shown in FIG. 39 and usable interchangeably therewith.
Figure 44:
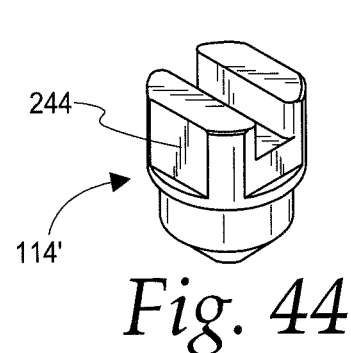
FIG. 44 is a bottom perspective view of a modified form of coupling system, according to the present invention.
Figure 45:
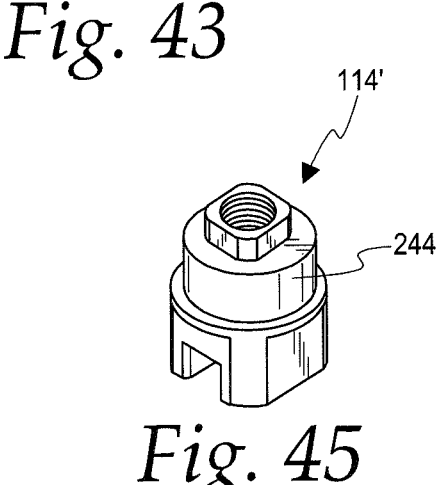
FIG. 45 is a bottom perspective view of the coupling system shown in FIG. 44.
Figure 46:
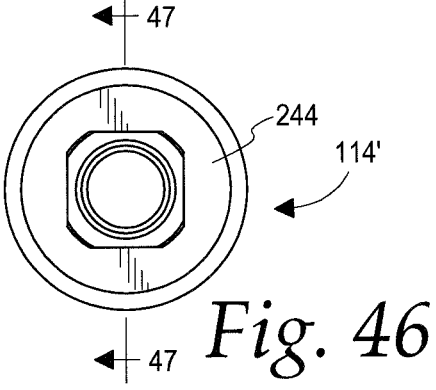
FIG. 46 is a plan view of the coupling system as shown in FIGS. 44 and 45.
Figure 47:
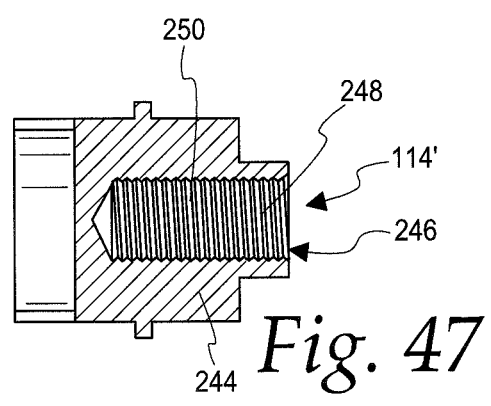
FIG. 47 is a cross-sectional view of the coupling system taken along line 47-47 of FIG. 46.

With respect to the adaptor assembly 120b, as shown in FIGS. 42 and 43, a third component 122b may be used in combination with a fourth component 122b' to make up the adaptor assembly 120b. The third component 122b can be used interchangeably with the first component 122a to accommodate a different form of driving component/rotary drive. There is no limitation as to how the forms of the first and third components 122a, 122b might be different, in terms of shape or size of the portion thereof projecting above the knob or upper housing part 124, to be coupled to the driving component/rotary drive 28. For example, the body 240 on the component 122b may have a longer axial extent or a different diameter than the corresponding body 186 on the component 122a.

Any other type of connection between the second and fourth components and a driving component/rotary drive is contemplated, whether or not primarily utilizing threads, or utilizing threads at all.

As depicted, an internally threaded bore 242 on the third component 122b has a smaller diameter than the threaded bore portion 220 on the first component 122a.

Further, the perimeter configuration of the bodies 186, 240 may have specific contours to cooperate with complementary parts of the driving component/rotary drive 28.

Similarly, the fourth component 122b' may differ from the second component 122a' as by reason of the form of the body or threads thereon—diameter, pitch, direction (left-handed or right-handed), etc.

As noted above, the components in the adaptor assemblies 120a, 120b may be interchanged and usable on either of the cores 118, 118a.

In a still further form of coupling system, as shown at 114' in FIGS. 44-47, a unitary part 244 has the same shape as the combined core 118, 118a and components 122a, 122b. The top 246 of the unitary body 244 has a blind bore 248 therein with internal threads 250 to cooperate with a component corresponding to the components 122a', 122b'.

It should be noted that any number and combination of components may be offered as a "kit" to facilitate adaptability of the basic cutting head 111 to different configurations of the driving component/rotary drive 28.

The kit may also be offered with one or more spacers 252 (FIG. 13), or other component(s), to maintain proper relative positioning of the cutting head 111 and the powering unit 22.

With certain of the above-described structures, particularly as shown schematically in FIGS. 10-12, it is contemplated that the core and the adaptor assembly directly engage the driven part 113 of the cutting head—in one preferred form being the spool. This affords operational stability.

As depicted in certain forms, each of the core and adaptor assembly is directly keyed to the spool for positive drive and distribution of driving forces over substantial areas of the confronting edges/surfaces whereby component alignment may be effectively maintained over the operating life.

The perimeter keying of the core to the spool also accounts for a positive drive of the particular driven part of the cutting head.

Figures 14, 15, 16, 17:
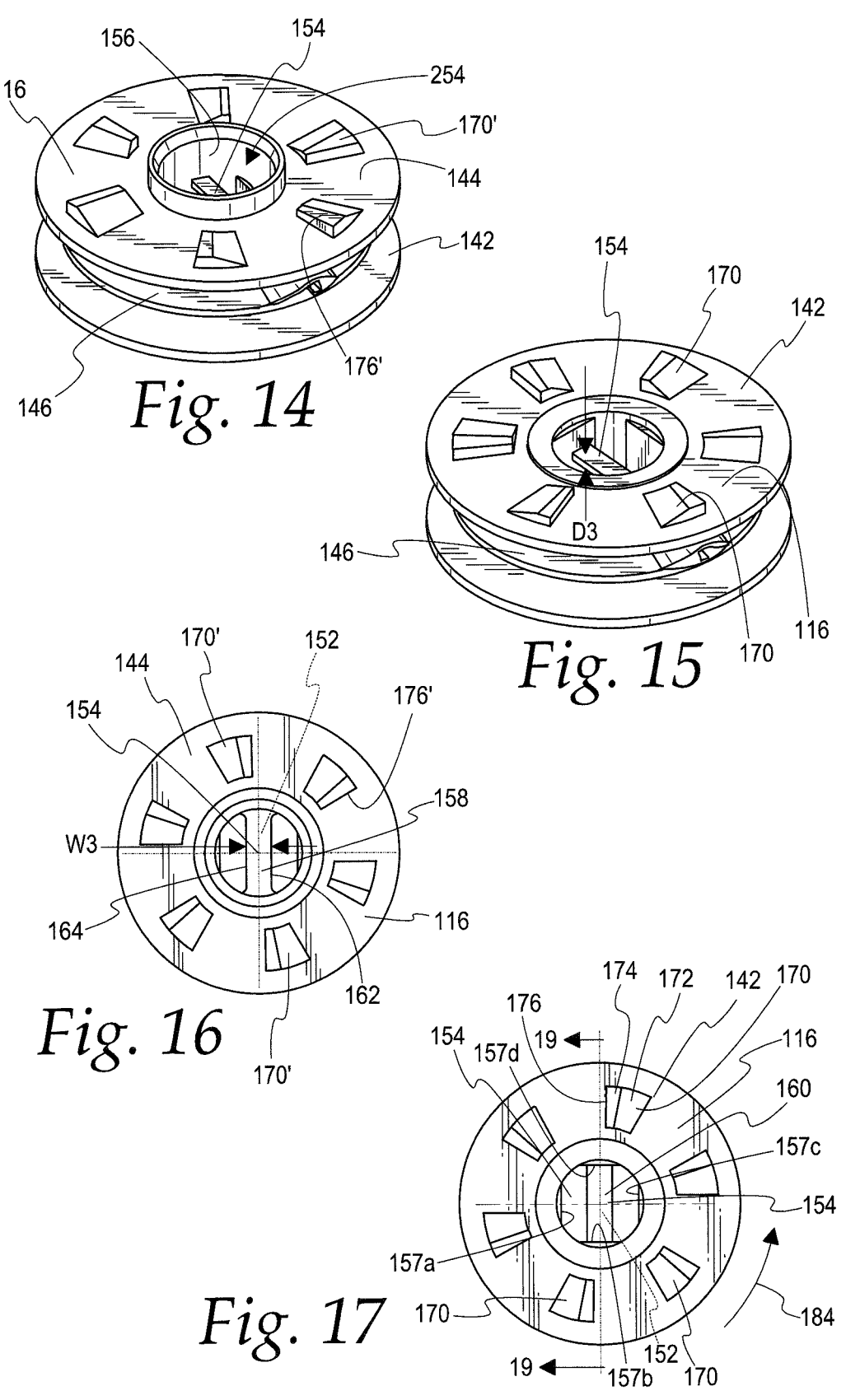
FIG. 14 is an enlarged, bottom, perspective view of a spool on the cutting head in FIG. 13.
FIG. 15 is a top perspective view of the spool in FIG. 14.
FIG. 16 is a bottom view of the spool in FIGS. 14 and 15.
FIG. 17 is a top view of the spool in FIGS. 14-16.
Figure 18:
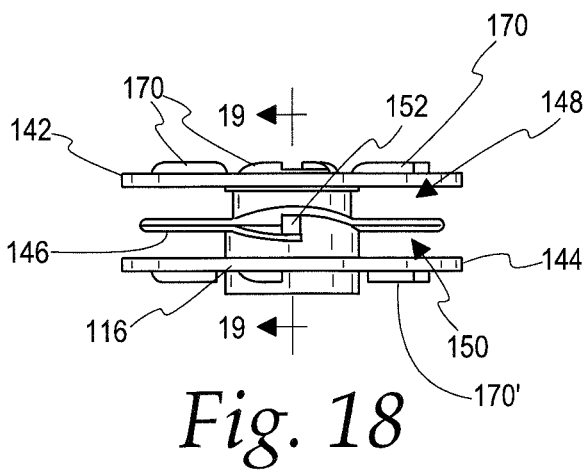
FIG. 18 is a side elevation view of the spool in FIGS. 14-17.
Figure 19:
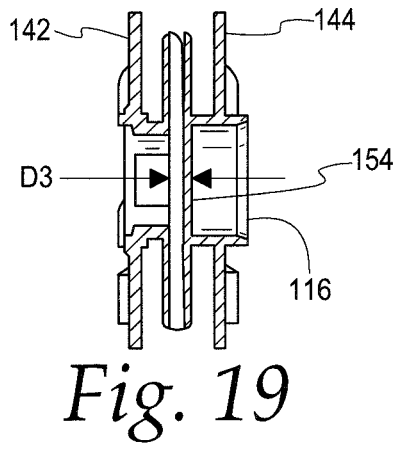
FIG. 19 is a cross-sectional view of the spool taken along line 19-19 of FIG. 18.

The driving mechanism may be further enhanced by making the coupling system 114, 114' such that the core and cooperating component(s) substantially fill a volume, identified for the exemplary volume 254 on the spool 116 in FIG. 14, bounded by the spool opening 156 and extending to the bottom surface 158 of the elongate bar 154. This produces a solid mass and creates positive engagement between the coupling system and the spool 116 that effectively maintains alignment of parts during operation.

At the same time, this configuration also produces a potentially solid abutting surface for the spring assembly 178 defined cooperatively by the core 118, first component 120a, and the elongate bar 154, which may be flush with, and at, the bottom of the elongate bar 154. This avoids pressure exertion on a relatively small surface area of the elongate bar 154, which is typically made from a non-metal material.

As described in the exemplary embodiments, apart from having confronting surfaces on the coupling system and elongate bar potentially extending along the full radial length of the elongate bar 154, the surfaces on the core that engage the spool, including the elongate bar 154, to effect keying, are in one form metal surfaces.

In one preferred form, all surfaces in the coupling system that engage the driven part of the cutting head 111 are made from metal. In depicted forms, all of the coupling system components, including the core and those making up the adaptor assemblies, are made from metal.

The foregoing disclosure of specific embodiments is intended to be illustrative of the broad concepts comprehended by the invention.

The invention claimed is:

1. In combination:
a cutting head having an operating axis and at least one cutting element for severing vegetation,
the cutting head comprising a housing and a spool joined with the housing on which the at least one cutting element is located,
the spool movable axially and angularly with respect to at least a part of the housing,
the spool configured to be driven around the operating axis to cause the at least one cutting element to move in a cutting path and thereby sever vegetation in the cutting path of the driven at least one cutting element,
the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and
a coupling system comprising a core and a first adaptor assembly portion,
the core and first adaptor assembly releasably joinable to each other and the spool,
the core configured so that when joined to the spool, the core keys directly to the spool so that the spool and core move together around the operating axis,
the first adaptor assembly extending from the core and defining a driven component to engage a driving component on the rotary drive to thereby couple the cutting head to the rotary drive,
wherein a part of the core that engages the spool to cause the core to be keyed directly to the spool is made from metal,
wherein with the core joined to the spool, a perimeter surface on the core is keyed to the spool to prevent relative turning of the core and spool around the operating axis.

2. The combination according to claim 1 wherein the first adaptor assembly is a single component that is releasably connected to the core and defines the driven component.

3. The combination according to claim 1 wherein the first adaptor assembly comprises first and second components, the first component releasably connected to the core and to the spool and the second component releasably connected to the first component and defining the driven component.

4. The combination according to claim 3 wherein the core and the first component are made from metal.

5. The combination according to claim 4 wherein the first component and core are press connected together and the first component and second component are threadably connected together.

6. In combination:
a cutting head having an operating axis and at least one cutting element for severing vegetation,

the cutting head comprising a housing and a spool joined with the housing on which the at least one cutting element is located,
the spool movable axially and angularly with respect to at least a part of the housing,
the spool configured to be driven around the operating axis to cause the at least one cutting element to move in a cutting path and thereby sever vegetation in the cutting path of the driven at least one cutting element,
the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and
a coupling system comprising a core and a first adaptor assembly,
the core and first adaptor assembly releasably joinable to each other and the spool,
the core configured so that when joined to the spool, the core keys directly to the spool so that the spool and core move together around the operating axis,
the first adaptor assembly extending from the core and defining a driven component to engage a driving component on the rotary drive to thereby couple the cutting head to the rotary drive,
wherein a part of the core that engages the spool to cause the core to be keyed directly to the spool is made from metal,
wherein the first adaptor assembly comprises first and second components, the first component releasably connected to the core and the second component releasably connected to the first component and defining the driven component,
wherein the core and the first component are made from metal,
wherein the core has a perimeter surface and a plurality of flat surface portions on the perimeter surface and the spool has flat surface portions that each facially confronts one of the flat surface portions on the perimeter surface,
whereby the confronting flat surface portions on the perimeter surface and spool cooperatively key the core to the spool.

7. The combination according to claim 4 wherein the spool has an elongate bar and the core has facing flat surfaces between which at least a part of the elongate bore resides, the part of the elongate bar and facing flat surfaces cooperating to key the core to the spool.

8. The combination according to claim 5 wherein the second component defines a male part with a first form and a first form of external threads to engage a driving component on the rotary drive with the cutting head coupled to the rotary drive.

9. The combination according to claim 4 wherein the first component has a perimeter surface, and the core has a through bore bounded by a surface which engages and is keyed to the perimeter surface on the first component.

10. The combination according to claim 8 further in combination with a second adaptor assembly, the first and second adaptor assemblies interchangeably usable, one in place of the other, together with the core, to allow coupling of the cutting head to the rotary drive, the second adaptor assembly defining a male part with a second form and a second form of external threads to engage a driving component on the rotary drive.

11. In combination:

a cutting head having an operating axis and at least one cutting element for severing vegetation, the cutting head comprising a housing and a spool joined with the housing on which the at least one cutting element is located, the spool movable axially and angularly with respect to at least a part of the housing, the spool configured to be driven around the operating axis to cause the at least one cutting element to move in a cutting path and thereby sever vegetation in the cutting path of the driven at least one cutting element, the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and a coupling system comprising a core and a first adaptor assembly, the core and first adaptor assembly releasably joinable to each other and the spool, the core configured so that when joined to the spool, the core keys directly to the spool so that the spool and core move together around the operating axis, the first adaptor assembly extending from the core and defining a driven component to engage a driving component on the rotary drive to thereby couple the cutting head to the rotary drive, wherein a part of the core that engages the spool to cause the core to be keyed directly to the spool is made from metal, wherein the first adaptor assembly comprises first and second components, the first component releasably connected to the core and the second component releasably connected to the first component and defining the driven component, wherein the core and the first component are made from metal, wherein the spool has an elongate bar and the core has facing surfaces between which at least a part of the elongate bar resides, the elongate bar and facing surfaces cooperating to key the core to the spool, wherein the elongate bar has axially spaced top and bottom surfaces, wherein the core has radially spaced and axially facing surfaces that are substantially flush with the bottom surface on the elongate bar.

12. The combination according to claim 11 wherein the spool has axially oppositely facing top and bottom surfaces, the spool has an opening with a volume into which the core can be directed, and the core, first adaptor assembly, and elongate bar together substantially fill the opening volume from the top surface of the spool to the bottom surface of the elongate bar.

13. The combination according to claim 12 wherein an elongate flexible line is wrapped around a portion of the spool and a length of the elongate flexible line projects away from the housing and defines the at least one cutting element.

14. The combination according to claim 13 wherein the elongate flexible line extends through an opening in the housing, the housing and spool are configured so that the spool can be controllably moved axially within the housing as the spool is driven to allow incremental relative angular movement between the spool and housing to occur as an incident of which a controlled length of the elongate flexible line is advanced outwardly through the housing opening.

15. The combination according to claim 14 wherein the cutting head further has a spring assembly acting between the spool and one part of the housing to produce an axial biasing force on the spool, and the spring assembly bears against the bottom surface of the elongate bar and the radially spaced and axially facing surfaces of the core.

16. The combination according to claim 1 further in combination with a portable frame and a power source on the frame with a driven rotary component that engages the adaptor assembly to cause the spool to be driven around the operating axis as the power source is operated.

17. The combination according to claim 1 wherein the housing comprises upper and lower parts configured to be releasably maintained together and between which the spool captively resides.

18. The combination according to claim 17 wherein the core extends through and projects to above the upper housing portion.

19. The combination according to claim 15 wherein the housing comprises upper and lower parts and the one part of the housing that the spring assembly acts between is the lower housing part.

20. The combination according to claim 3 wherein the first component has an axial dimension greater than an axial dimension of the core.

21. In combination:

a cutting head having an operating axis and at least one cutting element for severing vegetation, the cutting head comprising a housing and a spool joined with the housing on which the at least one cutting element is located, the spool movable axially and angularly with respect to at least a part of the housing, the spool configured to be driven around the operating axis to cause the at least one cutting element to move in a cutting path and thereby sever vegetation in the cutting path of the driven at least one cutting element, the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and a coupling system comprising a core and a first adaptor assembly, the core and first adaptor assembly releasably joinable to each other and the spool, the core configured so that when joined to the spool, the core keys directly to the spool so that the spool and core move together around the operating axis, the first adaptor assembly extending from the core and defining a driven component to engage a driving component on the rotary drive to thereby couple the cutting head to the rotary drive, wherein a part of the core that engages the spool to cause the core to be keyed directly to the spool is made from metal, wherein the spool has an elongate bar and the core has facing surfaces between which at least a part of the elongate bar resides, the elongate bar and facing surfaces cooperating to key the core to the spool, wherein the elongate bar has axially spaced top and bottom surfaces, wherein the spool has axially oppositely facing top and bottom surfaces and an opening with a volume into which the core can be directed, wherein the core, first adaptor assembly, and elongate bar together substantially fill the opening volume at least from the top surface of the spool to the bottom surface of the elongate bar.

22. In combination:

a cutting head having an operating axis and at least one cutting element for severing vegetation, the cutting head comprising a housing and a spool joined with the housing on which the at least one cutting element is located, the spool movable axially and angularly with respect to at least a part of the housing, the spool configured to be driven around the operating axis to cause the at least one cutting element to move in a cutting path and thereby sever vegetation in the cutting path of the driven at least one cutting element, the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and a coupling system comprising a core and a first adaptor assembly, the core and first adaptor assembly releasably joinable to each other and the spool, the core configured so that when joined to the spool, the core keys directly to the spool so that the spool and core move together around the operating axis, the first adaptor assembly extending from the core and defining a driven component to engage a driving component on the rotary drive to thereby couple the cutting head to the rotary drive, wherein a part of the core that engages the spool to cause the core to be keyed directly to the spool is made from metal, wherein the spool has an elongate bar and the core has facing flat surfaces between which at least a part of the elongate bar resides.

23. In combination:

a cutting head having an operating axis and at least one cutting element for severing vegetation, the cutting head comprising a housing and a spool joined with the housing on which the at least one cutting element is located, the spool movable axially and angularly with respect to at least a part of the housing, the spool configured to be driven around the operating axis to cause the at least one cutting element to move in a cutting path and thereby sever vegetation in the cutting path of the driven at least one cutting element, the cutting head configured to be coupled to a rotary drive and as an incident of the rotary drive being operated with the cutting head coupled to the rotary drive, the spool is caused to be driven around the operating axis as an incident of which the at least one cutting element moves in the cutting path; and a coupling system comprising a core and a first adaptor assembly, the core and first adaptor assembly releasably joinable to each other and the spool, the core configured so that when joined to the spool, the core keys directly to the spool so that the spool and core move together around the operating axis, the first adaptor assembly extending from the core and defining a driven component to engage a driving component on the rotary drive to thereby couple the cutting head to the rotary drive, wherein with the core joined to the spool, a perimeter surface on the core is keyed to the spool to prevent relative turning of the core and spool around the operating axis.

* * * * *